(12) United States Patent
Starodubtsev

(10) Patent No.: US 9,527,245 B2
(45) Date of Patent: Dec. 27, 2016

(54) METHOD OF 3D PRINTING

(71) Applicant: CREOPOP PTE. LTD., The Central Singapore (SG)

(72) Inventor: Dmitry Starodubtsev, Tomsk (RU)

(73) Assignee: CREOPOP PTE. LTD., The Central Singapore (SG)

( * ) Notice: Subject to any disclaimer, the term of this patent is extended or adjusted under 35 U.S.C. 154(b) by 164 days.

(21) Appl. No.: 14/601,263

(22) Filed: Jan. 21, 2015

(65) Prior Publication Data

US 2016/0059481 A1    Mar. 3, 2016

Related U.S. Application Data

(60) Provisional application No. 62/043,685, filed on Aug. 29, 2014.

(51) Int. Cl.
*B29C 35/08* (2006.01)
*B29C 41/02* (2006.01)
(Continued)

(52) U.S. Cl.
CPC ......... *B29C 67/007* (2013.01); *B29C 35/0805* (2013.01); *B29C 47/0002* (2013.01);
(Continued)

(58) Field of Classification Search
CPC .............. B29C 35/08; B29C 35/0805; B29C 2035/0827; B29C 2035/0833; B29C 41/02; B29C 41/36; B29C 41/52; B29C 47/0002; B29C 47/0811; B29C 47/0813; B29C 47/92; B29C 67/0051; B29C 67/0055; B29C 67/0059; B29C 67/0085; B29C 67/0088; B29C 67/0092; B29C 67/0096; B29C 71/04; B29K 2033/04; B29K 2033/12; B29K 2105/0094; B33Y 10/00; B33Y 70/00
(Continued)

(56) References Cited

U.S. PATENT DOCUMENTS

2006/0127153 A1* 6/2006 Menchik ............. B29C 67/0059 400/62
2016/0144570 A1* 5/2016 Kim ..................... B29C 67/0059 425/174.4

FOREIGN PATENT DOCUMENTS

CN    103341975    10/2013
CN    203357906    12/2013
(Continued)

*Primary Examiner* — Leo B Tentoni
(74) *Attorney, Agent, or Firm* — TransPacific Law Group; Pavel I. Pogodin, Esq.

(57) ABSTRACT

Provided is a method of 3D printing with the use of a heater-free, hand-held 3D printing device such as a 3D printing pen. The method consists of adjusting the extrusion feed rate of the substance through the orifice with the use of a substance feed mechanism to provide curing conditions at which the extruded substance maintains a shape-sustaining state; extruding the substance; and curing the extruded substance to the shape-sustaining state by irradiating the extruded substance outside the device with light-radiation elements such as LEDs. The feed rate of the extrusion is carried out once, experimentally, before multiple practical use of the heater-free 3D printing device. The extrudable substance is a photopolymerizable polymer composition that has kinematic viscosity in the range of 7.00 to 10.00 $\text{mm}^2/\text{c}$ when measured at room temperature by the capillarity method.

17 Claims, 2 Drawing Sheets

(51) Int. Cl.
  *B29C 41/36* (2006.01)
  *B29C 41/52* (2006.01)
  *B29C 67/00* (2006.01)
  *B29C 47/00* (2006.01)
  *B29C 47/08* (2006.01)
  *B29C 47/92* (2006.01)
  *B33Y 10/00* (2015.01)
  *B29K 33/04* (2006.01)
  *B29K 105/00* (2006.01)

(52) U.S. Cl.
  CPC ...... *B29C 47/0811* (2013.01); *B29C 47/0813* (2013.01); *B29C 47/92* (2013.01); *B29C 67/0055* (2013.01); *B29C 67/0059* (2013.01); B29C 2947/9258 (2013.01); B29C 2947/92571 (2013.01); B29K 2033/04 (2013.01); B29K 2105/007 (2013.01); B29K 2105/0094 (2013.01); *B33Y 10/00* (2014.12)

(58) Field of Classification Search
  USPC ............. 264/40.1, 40.7, 308, 405, 406, 412, 494, 264/496
  See application file for complete search history.

(56) References Cited

FOREIGN PATENT DOCUMENTS

| | | | |
|---|---|---|---|
| CN | 203371791 | 1/2014 | |
| CN | 203449607 | 2/2014 | |
| CN | 103707511 | 4/2014 | |
| WO | WO-2014204020 A1 * | 12/2014 | ......... B29C 67/0059 |

* cited by examiner

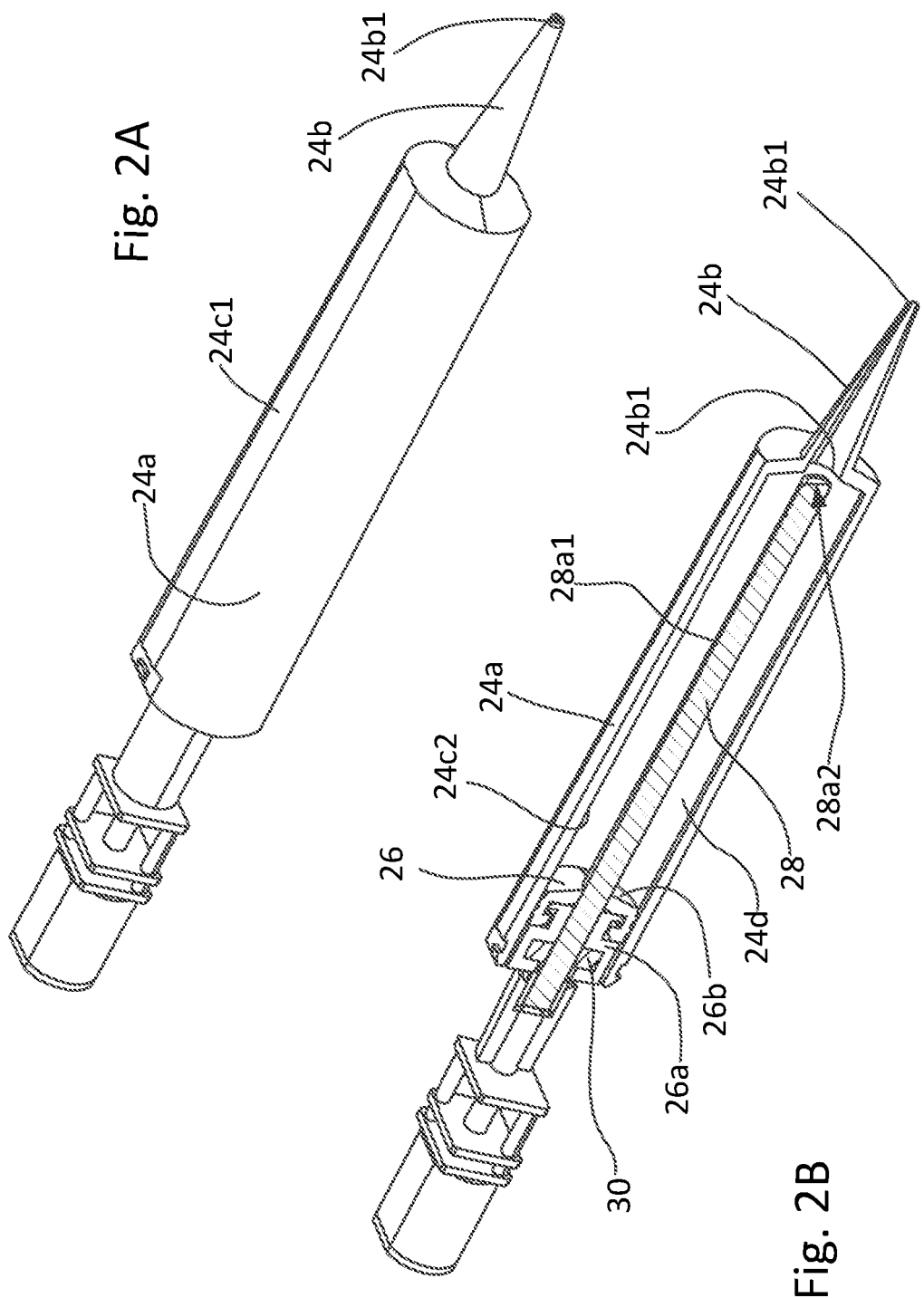

METHOD OF 3D PRINTING

CROSS-REFERENCE TO RELATED PATENT APPLICATION

The present regular U.S. patent application relies upon and claims the benefit of priority from U.S. provisional patent application No. 62/043,685 filed on Aug. 29, 2014, the entire disclosure of which is incorporated by reference herein.

BACKGROUND OF THE INVENTION

Field of the Invention

The present invention relates to 3D printing, in particular to a method of 3D printing based on a combination of extrusion and photopolymerization of a polymer paste. More specifically, the invention relates to a method of 3D printing with use of a hand-held 3D printing device and with photopolymerization of the extruded thread.

Description of Prior Art

Three-dimensional (3D) printing is the extrusion of a curable substance into a three-dimensional space to create a physical object, e.g., on the basis of a virtual three-dimensional model.

Three-dimensional printing technology originated in the mid-twentieth century, the same time at which the first 3D printers appeared. The price of these devices ranged from a few dozen to several hundred thousand dollars.

Presently, 3D printing processes are divided into the following basic categories:

1. Extrusion of material;
2. Photopolymerization;
3. Printing by sintering and melting of a material;
4. Printing objects by lamination of layers;
5. 3D printing by the Mcor technique (Mcor Technologies, Ireland and US); and
6. Contour manufacturing.

In terms of the material used for printing, 3D printing processes comprise the following three main groups:

1. Plastics, casting wax (this category also includes other materials suitable for creating 3D models by casting or melting);
2. Powders (this category includes all materials in powder form as well as powdered metals and metal alloys suitable for forming 3D objects); and
3. Photopolymers (including liquid photopolymers and resins).

All three classifications are closely related and require certain conditions for printing, i.e., the use of an appropriate technology. For example, printing with the materials listed in the first group requires the use of a special printing head with a heating element to melt the material and a mechanism for feeding the material to the nozzle. The second group requires the use of a special mechanism for changing or leveling the powder, as well as for thermally or optically affecting the material for curing. Material of the third group requires provision of a special feeder for photopolymer material as well as provision of a special source of light radiation.

Printers currently used for 3D printing are based on the extrusion of materials according to the principles of FDM (Fused Deposition Modeling) and DOD (Drop On Demand).

FDM is an additive manufacturing technology commonly used for modeling, prototyping, and production applications. FDM works on an "additive" principle by laying down material in layers; a plastic filament or metal wire is unwound from a coil and supplies the material to produce a part. The technology was developed by S. Scott Crump in the late 1980s and was commercialized in 1990. The term fused deposition modeling and its abbreviation FDM are trademarks of Stratasys.

DOD technology is a layered deposition of molten material droplets and the subsequent milling of each layer. Unlike the technology FDM, material melts before entering the printing head. The milling head cools the material and grinds the surface.

Both DOD and FDM processes use supports that are printed to form complex objects. The supports can be printed from the basic material or from a special material. To obtain final objects, the supports are removed. The photopolymerization technique uses a 3D printer based on SLA (stereolithography), MJM (Multijet Modeling), DLP (Digital Light Processing), and PolyJet (photopolymer materials sprayed onto a build tray in ultrathin layers until the object is completed).

Although 3D printing pens are relatively new products in the industry, some hand-held devices for 3D printing are known in the art.

For example, Chinese Patent Application Publication CN103707511 (A) of Apr. 9, 2014 (inventor: Bao Huhe) describes a 3D printing pen that comprises a shell with an outlet nozzle on one end and a material-feeding opening on the other end. The material is fed through a feeding tube to the nozzle via an adjustable electric heater and is extruded through the orifice of the nozzle. In such a device the material can be supplied in the form of a viscous liquid (e.g., an oligomer) or in the form of solid matter. In the first case, the extruded material is cured when exiting the nozzle. In the second case the solid material melts by preheating and then returns to a pasty or solid state with the lapse of time after exiting the nozzle.

Chinese Utility Patent CN203449607 (U) of Feb. 26, 2014 (inventors: Haixiong, et al) describes a 3D printing pen that comprises a housing that contains a heating coil for heating a material which is fed through the feeding tube arranged along the housing and then extruded through the nozzle located on the side of the housing opposite the material inlet opening. The heating coil is located near the nozzle at the output end of the feeding tube. The device is provided with a sensor and a control circuit. The heating temperature is shown on a small display provided on the side of the housing.

Chinese Utility model CN203371791 (U) of Jan. 1, 2014 (inventor: Wenliang) discloses a 3D pen that comprises a printing pen body consisting of a shell and an internal hollow body, wherein the front end of the shell comprises a discharging nozzle and the rear end of the shell comprises a feeding port. The feeding port and the discharging nozzle are connected with a feeding channel arranged in the hollow body. By connecting the feeding pipe at the tail part with the heating core at the front part, the feeding channel is formed. One end of the feeding pipe, which is close to the feeding port, is provided with a driving device in a linking manner. The driving device consists of a feeding control motor and a guiding wheel, which are linked. The space formed by the heating core and the shell is filled with insulated silica gel. A ventilating port is formed between the insulated silica gel and the shell in a blocking manner. The inner part of the hollow body also comprises a cooling fan, which communicates with the ventilating port. The 3D printing pen disclosed by the utility model has the advantage of a polymer material such as ABS (Acrylonitrile Butadiene Styrene), which is preheated or cooled to a certain temperature and is continuously discharged. The temperature of the material is constantly adjusted and maintained at a required level.

Chinese Utility Patent CN203357906 of Dec. 25, 2013 (inventors: Feizuo, et al) discloses a 3D printing pen that comprises a housing, an outlet head with a nozzle, a heating cavity, a drive motor, a material-feeding pipe, and a control panel with control buttons wherein the outlet head, the heating cavity, the drive motor, the material-feeding pipe, the control panel, and the control buttons are arranged in the housing. The outlet head is located at the front end of the housing. The heating cavity is arranged at the rear end of the outlet head. The control panel is provided with a control module, a power supply module, a heating module, and a motor module.

Chinese Patent Application Publication CN103341975 (A) of Oct. 9, 2013 (inventors: Feizuo, et al) discloses a 3D printing pen which in its structure and function is similar to one described in one of the aforementioned specific publications.

It can be seen that all methods of 3D printing with the use of a known 3D printing hand-held device such as, e.g., a 3D printing pen, are based on a thermal process for softening and melting of the material to be extruded through the nozzle of the 3D printing pen. In case of a polymer, heating provides thermal curing, which is achieved by arranging a heater, such as an electric heater, inside the housing of the device.

SUMMARY OF THE INVENTION

The present invention relates to 3D printing, in particular to a method of 3D printing based on a combination of extrusion and photopolymerization of a polymer paste. More specifically, the invention relates to a method of 3D printing with use of a hand-held 3D printing device and with photopolymerization of the extruded thread.

The method of the invention for 3D printing (hereinafter referred to as "the method of the invention") comprises the following steps:

1. providing a 3D printing device having a housing that contains at least a container with an extrudable, pasty substance (hereinafter "substance"), a substance feed mechanism, a nozzle for extrusion of the substance from the housing, substance curing diodes located in the housing near the nozzle, and adjusting means for adjusting the feed rate of the substance through the nozzle;

2. loading the container with the extrudable, pasty substance into the housing;

3. activating the substance-curing diodes to a radiation dosage required for curing the substance;

4. extruding the substance at the selected feed rate so as to provide an algorithm of curing at which the extruded substance is cured only after the substance leaves the nozzle and assumes a required shape;

5. extruding the substance; and 6. curing the extruded substance to the shape-sustaining state.

In the context of the present invention, the term "pasty" relates to the specific polymer composition, which is described below and has a viscosity ranging from 7.00 to 10.00 $MM^2/C$.

Contrary to conventional processes, the method of the invention does not require preheating of the substance, allows printing without the use of supports since the substance—when extruded—possesses plasticity sufficient for bending at a required angle and maintains shape due to preadjustment of the parameters of the aforementioned algorithm, and makes it possible to print without layers by forming 3D shapes, with the formation of vertical and horizontal planes in the same working cycle irrespective of the surface areas of these planes. In other words, the conditions of the paste that allow preservation of shape after extrusion without supports are provided by preselecting the rotational speed of the drive motor and/or the power of the UV-radiation LEDs at the 3D printer manufacturing stage. Thus, the feed rate of the substance and the power of the LEDs are preselected and are constant. This makes it possible to simplify the construction of the 3D printer. If necessary, however, the printer may be provided with means for adjusting the parameters of the aforementioned algorithm.

BRIEF DESCRIPTION OF THE DRAWINGS

FIG. 2A is a perspective external view of a cartridge of a hand-held 3D printing device.

FIG. 2B is a perspective, longitudinal and sectional view of the cartridge of the hand-held 3D printing device.

DETAILED DESCRIPTION OF THE INVENTION

Figure 1:
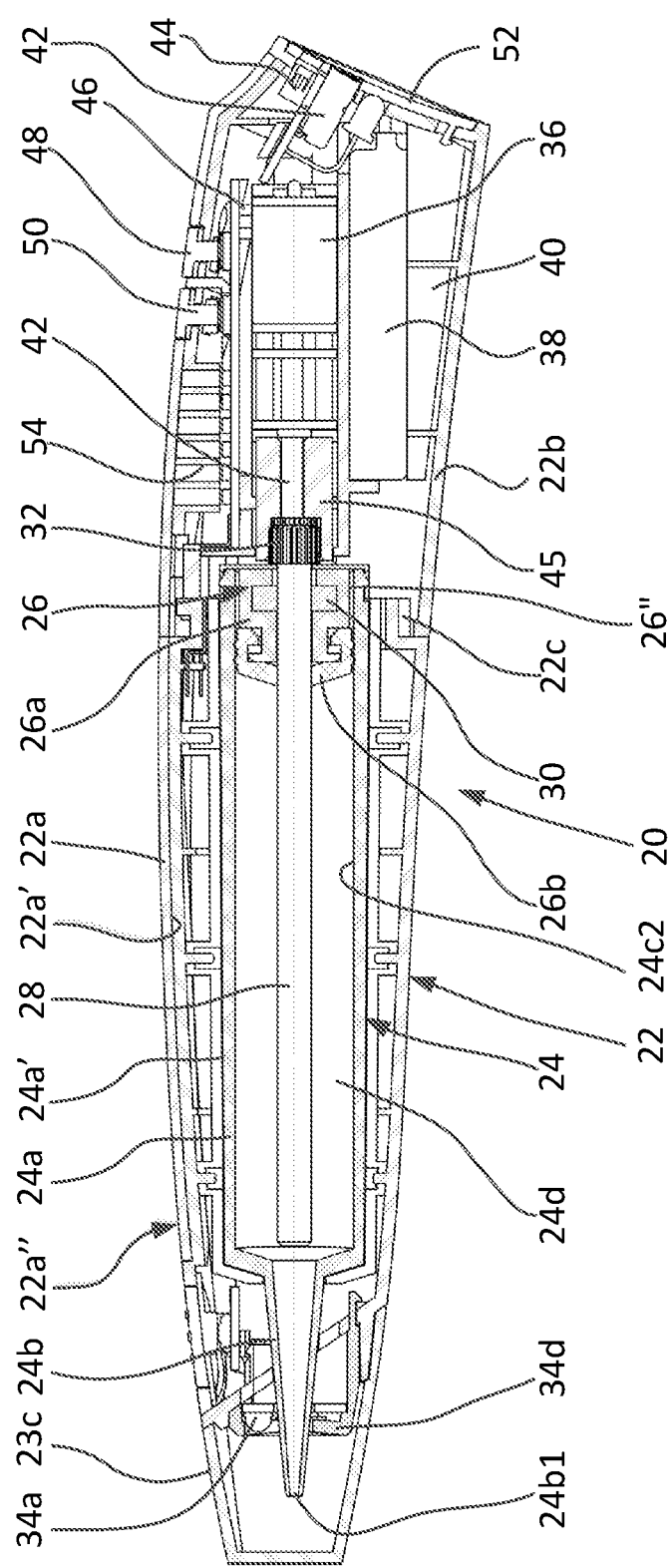
FIG. 1 is a longitudinal and sectional view of a hand-held device suitable for carrying out the method of the invention.

The present invention relates to 3D printing, in particular to a method of 3D printing based on a combination of extrusion and photopolymerization of a polymer paste. More specifically, the invention relates to a method of 3D printing with the use of a hand-held 3D printing device and with photopolymerization of the extruded thread.

The method of the invention for 3D printing (hereinafter referred to as "the method of the invention") comprises the following steps: providing a 3D printing device having a housing that contains at least one container with an extrudable, pasty substance (hereinafter "substance"), a substance feed mechanism, a nozzle for extrusion of the substance from the housing, substance-curing diodes located in the housing before the nozzle, and adjusting means for adjusting the feed rate of the substance through the nozzle; loading the container with the extrudable, pasty substance into the housing; activating the substance-curing diodes to a radiation dosage required for curing the substance; extruding the substance at the selected feed rate so as to provide an algorithm of curing at which the extruded substance is cured only after the substance leaves the nozzle and assumes a required shape; extruding the substance; and curing the extruded substance to the shape-sustaining state.

In the context of the present invention, the term "pasty" relates to the specific polymer composition, which is described below and has a viscosity ranging from 7.00 to 10.00 $MM^2/C$.

The polymer composition most suitable for carrying out the method of the invention is the following: 0.6 to 0.8 mass % triethyleneglycol dimethacrylate; 0.1 to 0.3 mass % polyethyleneglycol-600; 0.07 to 0.09 mass % polyethyleneglycol-4000; and 0.001 to 0.003 mass % in a system of initiators (phenyl-bis(2,4,6-trimethylbenzoyl) phosphineoxide, benzoyl peroxide, and ferric chloride.$7H_2O$). It is understood that this composition is given only as an example.

As mentioned above, the radiation-curable polymer composition has a kinematic viscosity measured at room temperature by the capillarity method in the range of 7.00 to 10.00 MM²/C. The measurements were conducted on the Viscosimeter VPZh-2 (Labtex, Moscow, Russia).

The determination of viscosity using a suitable capillary viscometer is carried out at a temperature of 20±0.1° C., unless otherwise prescribed. The time required for the level of the material to drop from one mark to the other is measured with a stopwatch to the nearest one-fifth of a second. The result is valid only if two consecutive readings do not differ by more than 1 percent. The average of no fewer than three readings gives the flow time of the material to be examined. The dynamic viscosity η(2.2.8) in millipascal seconds is calculated using this formula:

$$\eta = k\rho t$$

where:

k=constant of the viscometer, expressed in square millimeters per second squared ρ=density of composition to be examined, expressed in milligrams per cubic millimeter, obtained by multiplying its relative density (d) by 0.9982 t=flow time, in seconds, of the composition to be examined.

The constant k is determined using a suitable viscometer calibration liquid. The following formula is used to calculate the kinematic viscosity in mm²/s.

$$v = kt$$

The aforementioned algorithm of curing involves parameters such as initial temperature of the substance (according to the method of the invention the substance is loaded at room temperature because the 3D printing pen was constructed to provide a cold start), viscosity of the substance, initial dose of light imparted by the diodes to the substance directly before extrusion, rate of extrusion, etc. The 3D printing pen is the subject of pending U.S. application Ser. No. 14/578,391 of Dec. 20, 2014.

Contrary to conventional processes, the method of the invention does not require preheating of the substance, allows printing without the use of supports since the substance—when extruded—possesses plasticity sufficient for bending at a required angle and maintains shape due to preadjustment of the parameters of the aforementioned algorithm, and makes it possible to print without layers by forming 3D shapes with the formation of vertical and horizontal planes in the same working cycle irrespective of the surface areas of these planes. In other words, the condition of the paste that allows preservation of shape after extrusion without supports is provided by preselecting the rotational speed of the drive motor and/or the power of the UV-radiation LEDs at the 3D printer manufacturing stage. Thus, the feed rate of the substance and the power of the LEDs are constant. This makes it possible to simplify construction of the 3D printer.

In other words, the feed rate of the extrusion is adjusted once, experimentally, before multiple practical use of the heater-free 3D printing device. If necessary, however, the printer may be provided with means for adjusting the parameters of the aforementioned algorithm during the process.

A schematic view of an apparatus suitable for carrying out the method of the invention is shown in FIG. 1, which is a longitudinal, sectional view of a hand-held 3D printing device (hereinafter referred to as "device"). In FIG. 1 the device, as a whole, is designated by reference numeral 20. The device of the invention is distinguishable from conventional hand-held devices because it is a heater-free device, i.e., it does not have a heater for melting or softening of a substance since the substance is loaded in a pasty and flowable state and is cured by radiation energy on exiting the device.

Structurally, the device 20 comprises an elongated and hollowed housing 22 which has an inner surface 22a' and a front-end 22a" and consists of two connectable/disconnectable parts 22a and 22b. The housing parts 22a and 22b are molded from a hard plastic material such as polycarbonate, polytetrafluoroethylene, hard polyethylene, etc. The parts may have a snap or bayonet connection 22c. In FIG. 1, reference numeral 22d designates a protective cap 23c, which can be connected, e.g., by snapping, to the tapered and open front end of the housing part 22a.

One of main components of the 3D printing pen is a prefilled and disposable cartridge 24, which is filled with the pasty material to be used for 3D printing. In the context of the present invention, the term "pasty" means a radiation-curable polymer composition that has kinematic viscosity, measured at room temperature by the capillarity method, in the range of 7.00 to 10.00 MM²/C. The measurements were conducted on the Viscosimeter VPZh-2 (Labtex, Moscow, Russia).

The cartridge casing is a single, hollow, molded part having a cylindrical portion 24a with an open back end and a tapered nozzle portion 24b at the front end. The disposable cartridge 24 is shown in FIGS. 2A and 2B, where FIG. 2A is a perspective external view of the cartridge 24, and FIG. 2B is a perspective, longitudinal and sectional view of the cartridge 24. As seen in FIGS. 2A and 2B, part of the cylindrical wall of the part 24a has flats 24c1 and 24c2 on the outer surface of the cartridge and on the inner surface of the cartridge cavity, respectively. These flats extend along the entire length of the cylindrical part 24a of the cartridge 24. The purpose of the flat 24c1 is to prevent rotation of the cartridge inside the housing portion 22a when the cartridge is inserted into this portion of the housing through the back open end of the latter. A mating flat 22a' is formed on the inner surface of the housing part 22a.

The back open end of cylindrical portion 24a of the cartridge casing is closed and sealed by a piston unit 26 which consists of a piston 26a and a sealing element 26b made from a resilient chemically resistant material such as rubber, plastic, or the like. The sealing element hermetically seals the interior 24d of the cylindrical part 24a, which contains the material to be used for extrusion through the nozzle part 24b.

The device has a means that prevents rotation of the piston 26 inside the cartridge in the form of a flat 24c2 on the inner surface of the container portion of the cartridge and a flat 26" on the outer surface of the piston 26.

Inserted into the piston 26a in a cantilever manner is a lead screw 28 which has a diameter smaller than the inner diameter of the cylindrical portion 24a in order to provide enough room for the material to be extruded, filling the space between the inner surface of the cylindrical portion 24a of the cartridge and the outer surface of the screw.

The piston 26a contains a nut 30 that is engaged with the thread 28a1 of the lead screw 28. Since the cartridge 24 is disposable and is intended for single use, the piston 26a, the screw 28, and the nut 30 can be molded from a plastic material, and the nut 30 can be embedded into the body of the piston 26a. The free end 28a2 of the lead screw 28 is located close to the inlet opening 24b1 of the nozzle 28b but does not close it.

The end of the screw 28 opposite the nozzle 24b extends outside the end of the piston end of the part 24a of the cartridge and is provided with elements for connection with the screw-drive motor, which is described below. In the illustrated modification of the 3D printing pen, these connection elements are shown as splines 32 (FIG. 1).

The cartridge 24 is a disposable and interchangeable component of the 3D printing pen 20. In other words, the cartridge 24 can be selected to match specific 3D printing conditions by using cartridges with nozzles having different diameters of the outlet orifices and by filling the cartridge interior with different pasty materials. Based on the plurality of experiments, the inventors herein found that the best results in conjunction with the 3D printing pen of the invention for obtaining the extruded thread capable of maintaining its shape without the supports are obtained when the cartridge is filled with a predetermined radiation-curable polymer composition, which constitutes the subject of pending patent application Ser. No. 14/536,729 filed on Nov. 10, 2014. Such a composition comprises 60 to 80 mass % of oligoester acrylate; 10 to 30 mass % of liquid polyethylene glycol; 7 to 9 mass % of nonliquid polyethylene glycol; and 0.1 to 1 mass % of a system of photopolymerization initiators. It is also preferable that such a composition be extruded at an environmental temperature of 22° C. and an extrusion rate of 2.5 to 3.5 cm/sec through the nozzle 24b (FIG. 1) having an output orifice with a diameter ranging from 0.6 to 1.5 mm, with irradiation before extrusion with light having a wavelength ranging from 390 to 410 nm emitted by a plurality, e.g., by three LEDs, only two of which 34a, 34b are shown in FIG. 1. The total power of the radiation-energy-emitting means, i.e., LEDs 34a, 34b, 34c, ranges from 1 to 5 W.

The LEDs are circumferentially arranged around the tapered nozzle inside the hollow housing at equal angular spaces; i.e., when three LEDs are used, they are spaced at an angle of 120°.

The tip 24b1 of the nozzle 24b protrudes beyond the outlines of the housing part 22a (FIG. 1) to a distance sufficient for the user to observe the tip 24b1, and LEDs 34a, 34b, and 34c are supported by the LED holder 34d that forms the front wall of the housing part 22a. The LEDs are arranged so that their light beams (not shown) are focused on the thread of the material extruded from the nozzle orifice at the most efficient point in curing the extruded thread.

The rear housing part 22b contains a rotary drive motor, which comprises, e.g., a DC rotary motor 36 that is powered by a 12V battery cell 38 which is inserted into the hollow housing, and is conveniently located, e.g., in the battery compartment 40 formed inside the hollow housing part 22b. Alternatively, the drive power can be supplied to the motor from an external power supply source, e.g., through a mini USB 42 or an external control port 44. The output shaft 42 of the motor 36 rigidly supports a coupling sleeve 44, which is provided with spline slits into which the splines 32 of the lead screw 28 are inserted for transmitting rotation of the motor 36 to the lead screw 28.

The rear housing part 22b also contains a control panel 46 that supports the switch On/Off button 48 and a speed switch button 50 (FIG. 1), the upper ends of which are exposed to the outer surface of the housing part 22b. The back-end face of the housing part 22b is closed with an easily removable flat cover 52. The control panel also contains a control circuit (not shown) for controlling operation of the motor 36 and LEDs 34a, 34b, and 34c. Reference numeral 54 designates rigidity fins.

Although the invention has been described by way of a specific example, it is understood that this invention should not be construed as limiting the scope of the invention application and that any changes and modifications are possible without deviation from the scope of the attached claims. For example, substances other than photopolymerizable polymers can be used. Hand-held devices other than 3D printing pens, e.g., stationary devices or devices secured in the mechanical arm of the robot and controllable from the program, also are suitable for carrying out the method.

The invention claimed is:

1. A method of 3D printing comprising the following steps:
providing a heater-free 3D printing device comprising a housing that contains at least one disposable container with a pasty, extrudable substance and a nozzle with an outlet orifice at one end of the container for extruding the substance from the container, a substance feed mechanism, light-radiation devices located inside the housing near and around the nozzle for irradiating the substance extruded through the orifice for curing the extruded substance, and means for adjusting the feed rate of the extrusion of the substance through the orifice;
adjusting the feed rate of the extrusion of the substance through the orifice at least with the use of a substance-feed mechanism to provide curing conditions at which the extruded substance maintains a shape-sustaining state;
extruding the substance; and
curing the extruded substance to the shape-sustaining state by irradiating the substance with light-radiation devices.

2. The method of claim 1, wherein for an extrudable substance of each type the step of adjusting the feed rate of the extrusion is carried out once, experimentally, before multiple practical use of the heater-free 3D printing device.

3. The method of claim 2, wherein the extrudable substance is a photopolymerizable polymer composition.

4. The method of claim 3, wherein the light-irradiating devices are light-emitting diodes and wherein the step of curing the extruded substance is irradiating the extruded substance at its exit from the nozzle with light emitted by light-emitting diodes.

5. The method of claim 1, wherein a heater-free 3D printing device is a hand-held type of 3D printing device.

6. The method of claim 5, wherein for an extrudable substance of each type the step of adjusting the feed rate of the extrusion is carried out experimentally before multiple practical use of the heater-free 3D printing device.

7. The method of claim 6, wherein the extrudable substance is a photopolymerizable polymer composition that has kinematic viscosity in the range of 7.00 to 10.00 $\text{MM}^2/\text{C}$ when measured at room temperature by the capillarity method.

8. The method of claim 2, wherein the extrudable substance is a photopolymerizable polymer comprising the following: 0.6 to 0.8 mass % triethyleneglycol dimethacrylate; 0.1 to 0.3 mass % polyethyleneglycol-600; 0.07 to 0.09 mass % polyethyleneglycol-4000; and 0.001 to 0.003 mass % of at least one photopolymerization initiator selected from the group consisting of phenyl-bis(2,4,6-trimethylbenzoyl) phosphineoxide, bezoyl peroxide, and ferric chloride.7H$_2$O.

9. The method of claim 8, wherein a heater-free 3D printing device is a hand-held type 3D printing device.

10. The method of claim 9, wherein the extrudable substance is a photopolymerizable polymer composition that has kinematic viscosity in the range of 7.00 to 10.00 $\text{MM}^2/\text{C}$ when measured at room temperature by the capillarity method.

11. The method of claim 10, wherein for an extrudable substance of each type the step of adjusting the feed rate of the extrusion is carried out once prior to multiple practical use of the heater-free 3D printing device.

12. The method of claim 4, wherein the step of adjusting the feed rate of the extrusion prior to multiple practical use of the heater-free 3D printing device also comprises a step of adjusting the irradiation power of the light-emitting diodes.

13. The method of claim 12, wherein the extrudable substance is a photopolymerizable polymer comprising the following: 0.6 to 0.8 mass % triethyleneglycol dimethacrylate; 0.1 to 0.3 mass % polyethyleneglycol-600; 0.07 to 0.09 mass % polyethyleneglycol-4000; and 0.001 to 0.003 mass % of at least one photopolymerization initiator selected from the group consisting of phenyl-bis(2,4,6-trimethylbenzoyl) phosphineoxide, bezoyl peroxide, and ferric chloride.$7H_2O$.

14. The method of claim 13, wherein the extrudable substance is a photopolymerizable polymer composition that has kinematic viscosity in the range of 7.00 to 10.00 $MM^2/C$ when measured at room temperature by the capillarity method.

15. The method of claim 1, further comprising the step of further providing the 3D printing device with means for adjusting the power of the light-radiation devices individually or in combination with the step of adjusting the feed rate of the extrusion.

16. The method of claim 2, further comprising the step of further providing the 3D printing device with means for adjusting the power of the light-radiation devices individually or in combination with the step of adjusting the feed rate of the extrusion.

17. The method of claim 16, wherein the extrudable substance is a photopolymerizable polymer composition that has kinematic viscosity in the range of 7.00 to 10.00 $MM^2/C$ when measured at room temperature by the capillarity method.

* * * * *